United States Patent
Bettis et al.

(10) Patent No.: US 7,231,021 B2
(45) Date of Patent: Jun. 12, 2007

(54) DISTRIBUTED CUSTOMIZABLE VOICEMAIL SYSTEM

(75) Inventors: Sonny R. Bettis, Lawrenceville, GA (US); Jon S. Plotky, Lawrenceville, GA (US); Ian M. Moraes, Suwanee, GA (US); Philip L. Lowman, Ellijay, GA (US); James H. Spencer, Tucker, GA (US)

(73) Assignee: IP Unity Glenayre, Inc., Duluth, GA (US)

( * ) Notice: Subject to any disclaimer, the term of this patent is extended or adjusted under 35 U.S.C. 154(b) by 0 days.

(21) Appl. No.: 11/170,537

(22) Filed: Jun. 29, 2005

(65) Prior Publication Data

US 2006/0002521 A1  Jan. 5, 2006

Related U.S. Application Data

(60) Provisional application No. 60/584,444, filed on Jun. 30, 2004.

(51) Int. Cl.
*H04M 1/64* (2006.01)
(52) U.S. Cl. .............................. 379/88.17; 379/88.16; 379/88.22
(58) Field of Classification Search ............ 379/88.17, 379/88.16, 88.18, 88.19, 88.22; 709/201
See application file for complete search history.

(56) References Cited

U.S. PATENT DOCUMENTS

| | | | |
|---|---|---|---|
| 2003/0043978 A1* | 3/2003 | Gallagher | 379/88.18 |
| 2003/0215068 A1* | 11/2003 | Stein et al. | 379/88.17 |
| 2004/0225499 A1* | 11/2004 | Wang et al. | 704/257 |

* cited by examiner

*Primary Examiner*—Ovidio Escalante
(74) *Attorney, Agent, or Firm*—Smith Frohwein Tempel Greenlee Blaha LLC; Gregory Scott Smith

(57) ABSTRACT

A Voice Extensible Markup Language (VXML) based voicemail system that has a distributed architecture is disclosed. The VXML voicemail system includes a media server and an application server. The media server is in communication with a telephone network. The media server receives a telephone call through the telephone network and invokes a voicemail service of the voicemail system by sending a request to an application server. The application server is adapted to generate a Voice Extensible Markup Language (VXML) page in response to receiving the request and provide the media server with the VXML page to the media server, wherein the media server renders at least a portion of the VXML page. Methods for implementing VXML based voicemail systems are also disclosed. One method includes the steps: receiving a telephone call from a caller, the telephone call being received from a telephone network at a media server; receiving, at an application server, a request from the media server for a service; responsive to receiving the request, generating, at the application server, a Voice Extensible Markup Language (VXML) page; and rending at least a portion of the VXML page.

12 Claims, 2 Drawing Sheets

DISTRIBUTED CUSTOMIZABLE VOICEMAIL SYSTEM

CROSS-REFERENCE TO RELATED APPLICATION

This application claims priority to copending U.S. provisional application entitled, "VXML Based Telephone Service System," having Ser. No. 60/584,444, filed Jun. 30, 2004, which is entirely incorporated herein by reference.

This application is related to copending U.S utility patent application entitled "Distributed IP Architecture For Telecommunications System," filed on Mar. 15, 2005, and having Ser. No. 11/080,744, which is entirely incorporated herein by reference.

TECHNICAL FIELD

The present invention relates to telecommunications systems and, more particularly, to a VXML based telecommunications service provision system that provides services such as voicemail.

BACKGROUND OF THE INVENTION

Over the past several decades, the telecommunications industry has continued to expand and experience growth spurts in technology. One of the most prevalent services provided in recent telecommunications technology is voicemail. Voicemail has continued to expand and establish itself as a key element in the successful operations of most businesses. The typical voicemail system today can take on a variety of forms, including a computer card that can operate within a personal computer connected to a businesses telephone system, or a computer card or component that is directly integrated into the businesses telephone system, or as a service provided by a telecommunications company.

Most voicemail systems today typically are heavily reliant on software programming. The systems include many thousands of lines of code that typically execute on a single platform or computing device. The voicemail products are usually developed as the result of a great amount of effort by a highly skilled team of software programmers and hardware developers and typically, a single roll-out of a voice mail product requires many man-hours of development, testing, debugging and perfecting. The amount of work required in such a development effort does not lend itself to developing a customized product line but rather, is the most profitable when customers agree to purchase the fully developed product.

But in today's diverse society with ever expanding needs and nuances, it is difficult to develop a single product line that meets the needs of all prospective customers. Thus, developers are forced to develop products directed towards large business sectors, or attempt to deeply penetrate niche markets. Sometimes developers will launch multiple versions of a product in an attempt to capture a larger market share. This raises additional problems for the developers—mainly in the area of support. The more product variants that are sold, the more complex the companies support infrastructure must be to meet the needs of its customers.

One technique that can be employed by developers is to provide a product that can be customized by the user. Such a product can use configuration files and input parameters to allow for some level of customization in the operation of the system. Such a technique can somewhat address this need in the art; however, the technique falls significantly short of an ideal solution because it heavily relies on the developer to be able to comprehend and program into the system the ability to customize the operation in a manner that the end user will want. This is a daunting task.

Thus, there exists a need in the art for a telecommunications service platform that allows for complete customization by the end user or for the end user and that does not significantly increase the cost to develop, manufacture and market to the end user. The present invention provides such a solution.

SUMMARY OF THE INVENTION

One aspect of the present invention is directed towards a VXML based telecommunications system that allows the operation to be easily customized.

One aspect of the present invention is a voicemail application that is based on VXML. This aspect of the present invention provides great flexibility in modifying and customizing the system on a per customer basis.

Briefly described, in architecture, one embodiment of the voicemail system, among others, can be implemented as follows. A media server is in communication with a telephone network. The media server receives a telephone call through the telephone network and invokes a voicemail service of the voicemail system by sending a request to an application server. The application server is adapted to generate a Voice eXtensible Markup Language (VXML) page in response to receiving the request and provide the VXML page to the media server, wherein the media server renders at least a portion of the VXML page.

Embodiment of the present invention can also be viewed as providing methods for providing voicemail service. In this regard, one embodiment of such a method, among others, can be broadly summarized by the following steps: receiving a telephone call from a caller, the telephone call being received from a telephone network at a media server; receiving, at an application server, a request from the media server for a service; responsive to receiving the request, generating, at the application server, a Voice extensible Markup Language (VXML) page; and rending at least a portion of the VXML page.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

The present invention provides a distributed IP architecture, also described as a next-generation communications platform, for telecommunications equipment, such as a PBX, voicemail system, or the like. By utilizing the architecture of the present invention, the various functionalities of the telecommunications equipment can be divided amongst various physical components and the physical components can be geographically dispersed. Each of the components communicates with each other, as needed, through independent interfaces to an IP network. The complexities of interfacing to the telephone network are handled through a single gateway component and a simplified protocol is used for communication between the remaining components of the telecommunications equipment or to the telephone network through the gateway component.

It should be understood that the distribution of functionality illustrated in the figures and described, although having novel aspects in itself, is not the only acceptable arrangement, and aspects of the present invention could be incorporated into a system that includes fewer or more components and a different arrangement of functionality among the components.

Now turning to the drawings, in which like labels refer to like elements throughout the several views, various aspects and features of the present invention are described.

Figure 1:
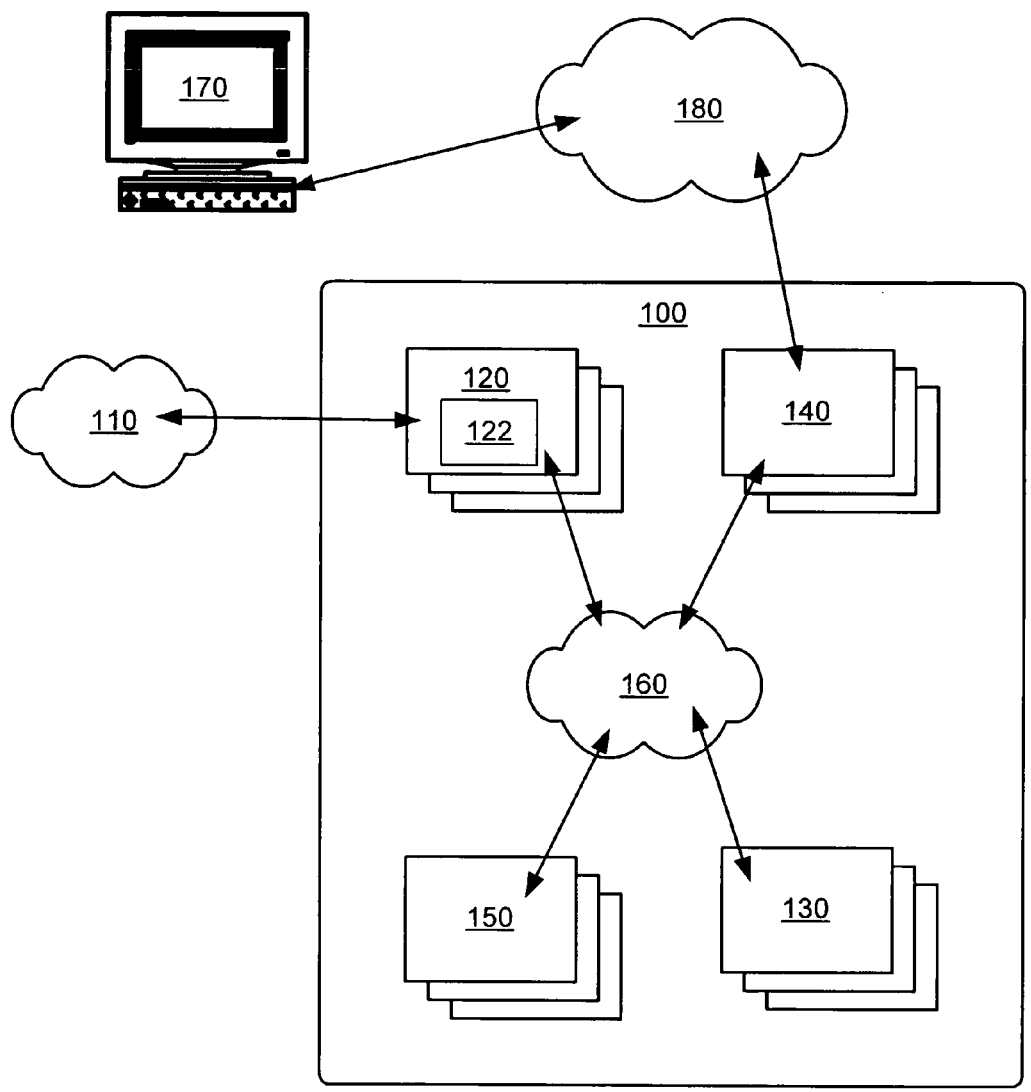
FIG. 1 is a block diagram illustrating an exemplary embodiment of a distributed voice messaging system in communication with a telephone network.

FIG. 1 is a system diagram illustrating the components and the connectivity of an exemplary next-generation communications platform 100. One aspect of the present invention is a distributed IP-based architecture for telecommunications equipment that, among other things, can provide telecommunication services such as voicemail, call forwarding and other telecommunication features. In the illustrated embodiment, the next-generation communications platform 100 has a distributed IP architecture and is connected to a telephone network 110. The telephone network 110 can be, among others, a wireless telephone network or a Public Switched Telephone Network (PSTN). The communications platform 100 is illustrated as including one or more media servers (MS) 120, one or more system management units (SMU) 130, one or more application servers (AS) 140 and one or more central data and message store (CDMS) 150, which are connected by a network 160. Typically, the network 160 is an Internet Protocol (IP) network such that communications over the IP network conform to an internet protocol (IP), which are well known in the art.

In some embodiments, a subscriber of the communications platform 100 can access the communications platform 100 via a computer 170, which is in communication with the application server 140 via a network 180, which typically is the internet. The application server 140 provides web pages to the computer 170, which are typically displayed to the subscriber using a browser (not shown). The application server can provide web pages having account information that the subscriber can review. Typically, the subscriber of the communications platform 100 has a voicemail account with the communications platform, and in some embodiments, the subscriber can customize his or her voicemail account by providing information, or subscriber-customizers, to the application server 140. Typically, the subscriber can provide information to the application server 140 by entering information into fields of a web page provided by the application server 140 or by selecting options.

Briefly described, the media servers 120 terminate IP from components of the communications platform 100 and/or terminate circuit switched traffic from the telephone network 110. The media servers 120 are also responsible for trunking and call control.

Among other things, the application server 140 generates dynamic VoiceXML (VXML) pages for various applications. The application servers 140 provide the VXML pages to the media servers 120, which render the VXML pages or portions of the VXML pages. The applications servers 140 also provide an external interface to the communications platform 100 through web pages provided to subscriber computers 170.

The SMU 130 is a management portal that enables service providers to provision and maintain subscriber accounts and manage network elements from a centralized web interface.

The CDMS 150 stores voice messages, subscriber records, and manages specific application functions including notification. In some embodiments, the CDMS 150 stores subscriber customizers and subscriber attributes, both of which are described in detail hereinbelow.

Each of the components in the next-generation communications platform 100 is independently scalable and independently interconnected onto the network 160. Thus, the components can be geographically distributed but still operate as a single communications platform as long as they can communicate with each other over the network 160. This is a significant advantage of the present invention that is not available in state-of-the-art communication systems. Selected components of the communication platform 100 are described in greater detail hereinbelow.

Media Server (MS)

The MS 120 terminates circuit-switched traffic from the telephone network 110. The MS 120 is responsible for call set up and control within the platform architecture. The MS 120 processes input from the user in either voice, DTMF format or other signaling scheme (much like a web client gathers keyboard and mouse click input from a user). The MS 120 presents content to the user in voice form (similar in principle to graphic and text displayed back to the user on a PC client). This client/server methodology enables rapid creation of new applications and quick utilization of content available on the World Wide Web.

The MS 120 processes incoming calls via requests to the AS 140. The requests to the application server are typically done by sending a Uniform Resource Locator (URL) or other internet standard to the application server 140. Among other information provided to the AS 140, the MS 120 normally includes the telephone number of the incoming call, i.e., the telephone number dialed by the caller of the incoming call.

A load balancer (not shown) preferably directs traffic arriving at the MS 120 to one of the plurality of ASs 140. This functionality ensures that traffic is allocated evenly between active servers. The MS 120 works as the VoiceXML client on behalf of the end-user in much the same manner as a client like Netscape works on behalf of an HTML user on a PC. The media servers include a VoiceXML browser 122 that renders VoiceXML pages for presentation to users.

VoiceXML is a standards-based scripting language for developing voice-enabled software applications. This means that developers use and leverage Web-based (HTML) development expertise in developing speech-based telephony applications.

In addition, in a preferable embodiment, the media server 120 is constructed of commercial-off-the-shelf (COTS) hardware and software components and is a carrier-grade server. Telephony interface and resource boards for telephony-specific applications can also be added. For instance, a facsimile card or software can be added to the media server 120 to manage facsimile termination.

Application Server (AS)

The modular design of the next-generation communications platform has the added advantage that it is easy to deploy enhanced services, such as voice dialing and voice navigation, unified communications solutions, multimedia messaging services, and presence & availability management applications. Adding applications to the platform is accomplished via the addition of standard application servers 140 to the common platform Each application server 140 generates application documents such as, but not limited to, VoiceXML pages and HTML pages. Typically, the VXML pages are generated in response to requests from the media server 120, and the HTML pages are generated in response to requests from the subscriber computer 170. The application server 140 leverages a web application infrastructure to interface with back-end data stores such as CDMS 150 to generate the VXML pages.

The overall web application infrastructure separates the core service logic (i.e., providing the business logic) from the presentation details (VXML) to provide a more extensible application architecture. In one embodiment, the application server 140 utilizes Java 2 Enterprise Edition (J2EE) environment and Java Server Pages (JSP) to create the dynamic VXML pages for the media server. Combining these technologies enables rapid incorporation of Speech Application Language Tags (SALT) to provide interoperability (multimodal) between applications like WAP, HTML, XHTML and voice—allowing the end user to simultaneously input data via voice command and receive presentation via WAP or HTML.

To create an environment for easy application development, the application server 140 preferably supports Template+JSPs. Applications are implemented in JSPs using an API for access to messaging functions. These JSPs are readily modifiable making changes in application behavior and creation of new applications very easy.

The cooperation of the media server 120 and the application server 140 allows for customization of features, voicemail functions, user-interface, offered to subscribers. In one embodiment, application server 140 retrieves subscriber-customizers from the CDMS 150 and uses the subscriber-customizers when generating VXML pages. The VXML pages generated using subscriber-customizer correspond to the subscriber specified custom features, voicemail functions, and user-interface. For example, a subscriber might want to customize his voicemail account by changing the order of menu items offered to a caller or by changing the voicemail functions invoked by the selection of an option, etc.

Common Database and Message Store (CDMS)

Figure 2:
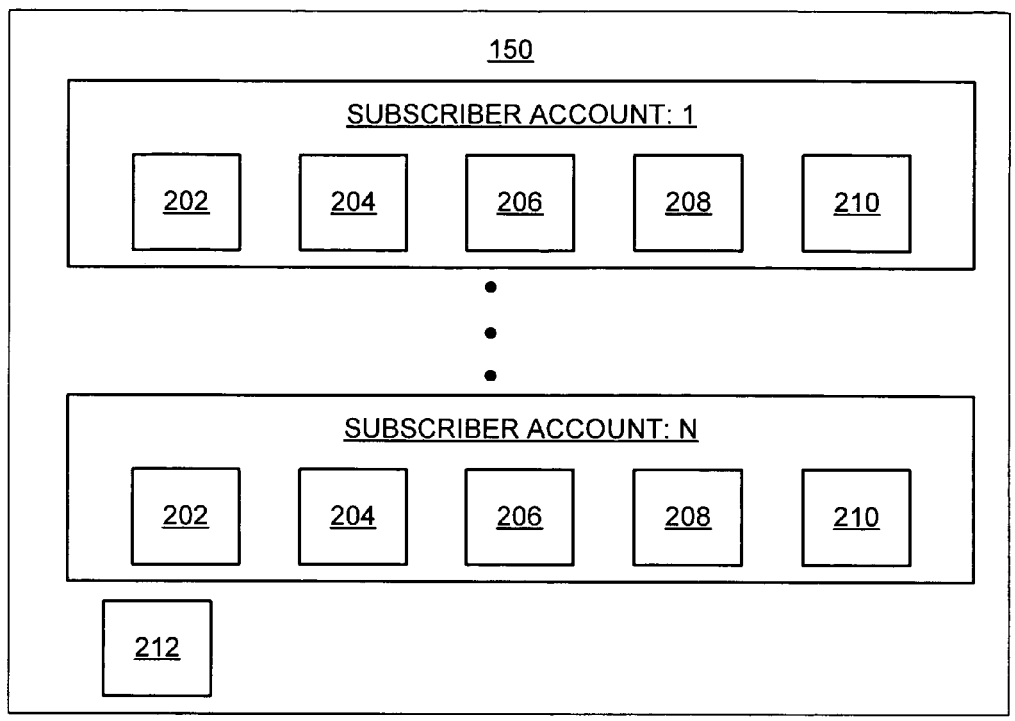
FIG. 2 is block diagram of content stored in a central data and message store.

Referring to FIG. 2, the CDMS 150 has sufficient storage capacity such that the communications platform 100 can provide services to multiple subscribers. Stored in the CDMS 150, among other things, are voice/audio messages 202, subscriber records 204, subscriber account information 206, account attributes 208, and subscriber-customizers 210. In some embodiments, each subscriber has their own account attributes 208, and in other embodiments, account attributes can be shared with multiple subscribers.

The CDMS 150 is preferably designed with fully redundant components and utilizes reflective memory and Redundant Array of Independent Disks (RAID) technology for fault tolerance, immediate fail over and recovery. This ensures five 9's availability for associated hardware and software components. Essential disk drive and RAID controller components are preferably "hot swappable" eliminating the need to power down the system for replacements. With the CDMS 150, performance is optimized for the unique characteristics of voice messaging, eliminating the performance degrading, unnecessary e-mail-centric database functionality that comes with the searching and sorting of e-mail stores.

The CDMS 150 can utilize standard of the shelf e-mail storage systems. The message store is abstracted through the use of Java middleware that allows the selection of the message store to be transparent to the application, enabling each message type to be stored in the most efficient store possible.

Voice/audio messages 202 are stored on the CDMS 150 when a caller leaves a voicemail message for a subscriber. Voice/audio messages 202 also include voice/audio messages transferred and or forwarded between subscribers. Voice/audio messages 202 can also include the subscriber's "greeting," which can be played to a caller.

Records for each subscriber are stored in subscriber records 204 for that subscriber. Information included in subscriber records includes, but is not limited to, the number of calls and/or faxes for a give time period, number of saved messages, number of recorded messages, number of non-retrieved messages.

Subscriber account information 206 includes subscriber name, telephone number for the account, distribution lists, forwarding telephone number(s), and billing information.

Account attributes 208 include attributes that can be used to augment, modify or control the content of the VXML page rendered by to the media server 120 or the manner in which the VXML page is rendered. Non-limiting examples of account attributes 208 include a language indicator, which can specify a language used in VXML pages generated by the application server 140, temporal indicators, calling number trigger, area code trigger. A temporal indicator can be used to modify a subscriber's voicemail account based upon the time-of-day, day of week, etc. An area code trigger can be used to modify a subscriber's voicemail account based on the area code of the calling number. The calling number trigger can be used to modify the subscriber's account based upon the calling number. In some embodiments, the attributes can be supplied by the subscriber using computer 170, and in some embodiments, the subscriber can specify how the subscriber's voicemail account is modified by the attributes. It should be remembered that the account attributes described hereinabove are non-limiting examples and other attributes can also be used.

Subscriber-customizers 210 can be provided by the subscriber using computer 170. The subscriber can provide the subscriber-customizers to provide customized VXML pages. Typically, a subscriber provides subscriber-customizers 210 by accessing the communications platform 100 using computer 170. The application server 140 provides the subscriber with web pages, which are displayed in a window of a browser on the computer 170. The subscriber can then select customizable options. For instance, for each menu presentation in a VXML page, the subscriber-customizers can be used to define the order in which the options are presented, the key presses associated with selecting the options, and the voicemail functions such as, but not limited to, transferring calls, forwarding messages, deleting messages stored in the CDMS 150, deleting messages stored in the CDMS 150, changing the subscriber's greeting, etc.

System Management Unit (SMU)

The SMU 130 provides a centralized point for service providers to manage all network elements, providing remote access, maintenance, and backup functionality. The SMU 130 provides a single interface for provisioning, alarming, reports, and subscriber migration. The SMU 130 integrates and customizes systems with new elements and applications, and provides operational support and network management functions for carriers experiencing swiftly growing networks and exploding traffic volumes.

Voicemail Operation

Figure 3:
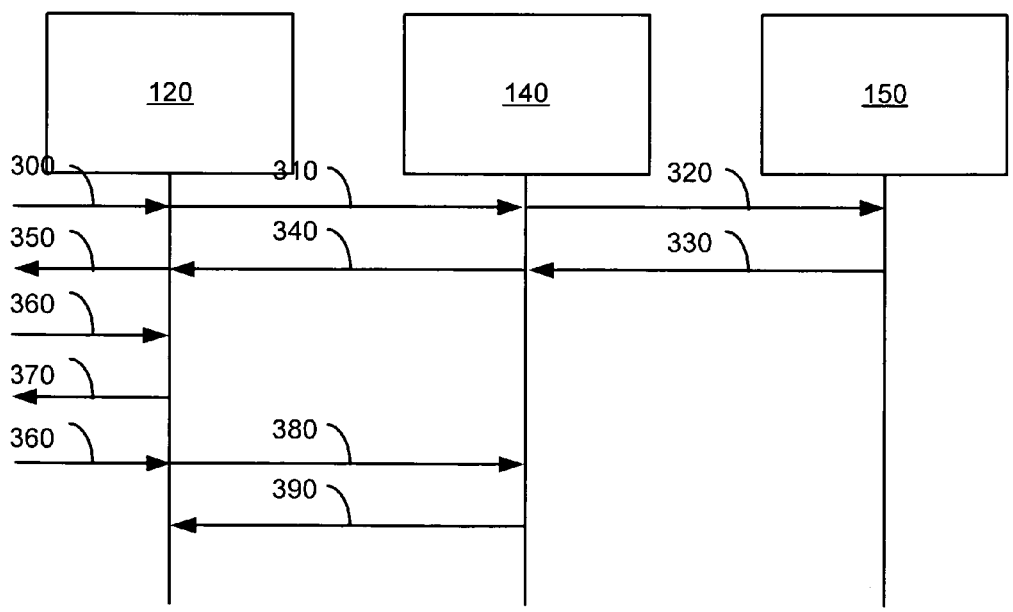
FIG. 3 is an exemplary flow diagram for performing voicemail.

Referring to FIG. 3, initially a service request 300 is received at the media server 120. The service request may take on a variety of forms and may represent a variety of services such as, but not limited to, an inbound call voice call, a call transfer, an inbound facsimile, an inbound text message, or a variety of inbound or outbound services typical to a telephonic or voicemail system. In the illustrated example, the service request 300 is the reception of an inbound call to a subscriber's number. The media server 120 can use functions such as, but not limited to, Automatic Number Identification (ANI) and Dialed Number Identification Number Service (DNIS) to gather information such as, but not limited to, the calling number and the called number. In addition, the media server 120 can also gather other information such as Trunk Group.

The media server 120 responds to the inbound call by invoking a service of the communications platform 100. The media server invokes the service by sending an invoke-service message 310 to the application server 140. Typically the invoke-service message 310 conforms to an internet protocol. The invoke-service message 310 typically includes information such as the called number. The invoke-service message 310 can also include a service tag or other identifier that the application server 140 uses to determine which type of service the media server is invoking. For example, in some embodiments, the media servers 120 is adapted to determine whether the incoming call is a voice-call or a facsimile transmission and responsive to determining the type of incoming call, the media server 120 includes the appropriate service tag in the invoke-service message 310.

Depending on the service request, the operation of invoking the service may vary greatly. In the instant example, the media server 120 may include the number that was called when invoking the service. In an exemplary embodiment, the media server 120 invokes the request by sending a URL to the application server 140. This is similar to the operation of a typical web oriented browser when requesting the loading of an HTML type page. In this case, the media server 120 is invoking a particular VXML page from the application server 140. The process of sending the URL to the application server 140 basically instructs the application server 140 to provide a VXML page to the media server 120. In some embodiments, the URL instructs the application to provide a default VXML page.

The application server 140 may use information in the invoke-service message 310 to look up subscriber information stored in the CDMS 150. The application server 140 sends an application server query 320 to the CDMS 150. Typically, the application server query 320 includes information carried by the invoke-service message 310. For instance, the application server 150 may use the called number to get subscriber information associated with the subscriber to whom the called number is assigned.

The CDMS 150 sends a response 330 to the application server 140. The response 330 may include some or all of the account attributes 208 associated with the called number and/or some or all of the subscriber-customizers 210 associated with the called number.

The application server 140 uses some or all of the account attributes 208 and/or subscriber-customizers 210 when the application server generates VXML pages. Typically, the application server 140 may use some account attributes 208 (and/or subscriber-customizers 210) in some VXML pages and other account attributes 208 (and/or subscriber-customizers 210) in other VXML pages.

Thus, the application server 140 builds a VXML page 340 based on the information provided from the CDMS 150. In performing this function, the application server 140 puts in user specific or other specific data into the VXML page 340 and passes the VXML page 340 to the media server 120.

In some situations, the media server 120 renders the entire VXML page 340 to the caller and in other situations the media server renders at least one portion of the VXML page 340. In the embodiment illustrated, the media server 120 renders a portion 350 of the VXML page 340. The rendered portion 350 is provided to the caller.

Once the rendered portion 350 is provided to the caller, the caller may provide further input 360 to the media server 120, and the media server 120 might respond to the input 360 in different ways. For example, the media server 120 might respond to the input 360 by providing the same portion 350 of the VXML page 340 or by rendering a different portion of the VXML page 340. For instance, the VXML page 340 may be a menu selection. When the caller makes a selection (provides input 360) by pressing a button or making an audible statement, this may result in the media server 120 moving to a particular form (or portion) on the VXML page 340. The media server 120 will then render the particular form and provide the rendered portion 370 to the caller. Alternatively, if the input 360 did not correspond to one of the menu items, the media server 120 will re-provide the rendered portion 350.

In some situations, the input 360 might cause the media server 120 to send a request 380 to the application server 140. The request might be for a new service of the communication platform 100 or might be for another VXML page. The media server 140 responds to the request 380 by sending another VXML page 390, which might be related to another service of the communications platform 100 or another page related to voicemail service, to the media server 120.

For example, assume that the caller is the subscriber of the communication platform for the called number and that the first VXML page 340 is related to the invocation of the voicemail service for the caller. In that case, assuming the input 350 is an option for retrieving messages stored in the CDMS 150, then the second VXML page 390 might carry information related to messages stored in the CDMS 150.

Thus, advantageously, simplex forms or actions can be handled by the media server jumping to various locations in a loaded VXML page while complicated functions may be met by requesting additional pages from the application server.

In addition, the VXML system of the present invention advantageously allows for the system to operate in a vast number of different manners to appear as though it is a custom system for each user or caller, when in fact the system does not have to be modified at all but rather, just simply control attributes associated with particular trigger mechanisms (such as area code, caller ID, ANI, time of day, etc,) can be programmed and then used to augment the system.

Another aspect of the present invention is that various selected or situation dependent parameters can be used to define the URL that invokes the various VXML pages. For instance, if a user is calling from his or her home telephone number, the ANI can be used to generate URLs from the application server. Thus, customized VXML pages can be loaded and rendered based on the phone number from which the call is placed. This could also be implemented by prompting the calling party to select a mode, etc. As another example, if a call is received from a number originating in Mexico or some other country, VXML pages that are specifically associated with the language of that country could be invoked by automatically generating URLs dependant upon that country code.

It should be emphasized that the above-described embodiments of the present invention, particularly, any "preferred" or "exemplary" embodiments, are merely possible examples of implementations, merely set forth for a clear understanding of the principles of the invention. Many variations and modifications may be made to the above-described embodiment(s) of the invention without departing substantially from the spirit and principles of the invention. It should also be appreciated that any particular embodiment may include only some of the various aspects of the present invention. All such modifications and variations are intended to be included herein within the scope of this disclosure and the present invention and protected by the following claims.

What is claimed is:

1. A distributed voicemail system comprising:
   a media server in communication with a telephone network, the media server adapted to send a request to invoke a voicemail service of the distributed telecommunications platform in response to receiving a telephone call from a caller, the telephone call being received from the telephone network;
   an application server in communication with the media server, the application server adapted to receive the request, wherein responsive to receiving the request the application server generates a Voice eXtensible Markup Language (VXML) page and provides the media server with the VXML page, wherein the media server renders a first portion of the VXML page to the caller;
   a central data and message store (CDMS) in communication with the application server, the CDMS having voicemail account attributes stored therein, wherein the CDMS provides the application server with an attribute for a specific voicemail account, and wherein the application server generates a custom VXML page using the attribute; and
   the media server being responsive to receive a selection indicator from the caller over the telephone network and, in response to the selection indicator, render a second portion of the VXML page independent of the application server and other components in the distributed voicemail gateway.

2. The distributed voicemail system of claim 1, wherein the attribute is at least one of temporal modification, geographic modification, calling number modification, and area code modification.

3. A distributed voicemail system comprising:
   a media server in communication with a telephone network, the media server adapted to send a request to invoke a voicemail service of the distributed telecommunications platform in response to receiving a telephone call from a caller, the telephone call being received from the telephone network;
   an application server in communication with the media server, the application server adapted to receive the request, wherein responsive to receiving the request the application server generates a Voice eXtensible Markup Language (VXML) page and provides the media server with the VXML page, wherein the media server renders a first portion of the VXML page to the caller;
   a CDMS having a subscriber-customizer that is associated with the VXML page stored therein, wherein the subscriber-customizer is provided by a subscriber of the distributed voicemail system, wherein the application server uses the subscriber-customizer in generating the VXML page, whereby the VXML page is customized by the subscriber-customizer; and
   the media server being responsive to receive a selection indicator from the caller over the telephone network and, in response to the selection indicator, render a second portion of the VXML page independent of the application server and other components in the distributed voicemail gateway.

4. The distributed voicemail system of claim 3, wherein the VXML page has a plurality of menu options, and wherein the subscriber-customizer defines the order of the menu options.

5. The distributed voicemail system of claim 3, wherein the VXML page has a plurality of menu options, and wherein the subscriber-customizer associates an input with each menu option, wherein responsive to the caller providing a given input, the menu option that is associated with the given input is selected.

6. The distributed voicemail system of claim 3, wherein the VXML page has a plurality of menu options, and wherein the subscriber-customizer defines a voicemail function for at least one of the menu options.

7. A method of providing voicemail service, the method comprising the steps of:
   receiving, at a media server, a telephone call from a caller, the telephone call being received from a telephone network;
   receiving, at an application server, a request from the media server for a service;
   responsive to receiving the request, generating, at the application sewer, a Voice eXtensible Markup Language (VXML) page;
   the media sewer rendering a first portion of the VXML page and then, in response to a signal received from the caller, rendering a second portion of the VXML page independent of the application server;
   providing a central data and message store (CDMS), which is in communication with the application server, the CDMS having an attribute for voicemail account stored therein; and
   retrieving the attribute from the CDMS, wherein the application server uses the attribute in the step of generating the VXML page.

8. The method of claim 7, wherein the attribute is at least one of temporal modification, geographic modification, calling number modification, and area code modification.

9. A method of providing voicemail service, the method comprising the steps of:
   receiving, at a media server, a telephone call from a caller, the telephone call being received from a telephone network;
   receiving, at an application server, a request from the media server for a service;

responsive to receiving the request, generating, at the application sewer, a Voice eXtensible Markup Language (VXML) page;

the media server rendering a first portion of the VXML page and then, in response to a signal received from the caller, rendering a second portion of the VXML page independent of the application server;

enabling a subscriber of the voicemail service to provide a subscriber-customizer;

storing the subscriber-customizer in a central data and message store (CDMS); and retrieving the subscriber-customizer, wherein the application server uses the subscriber-customizer in the step of generating the VXML page, whereby the VXML page is customized by the subscriber-customizer.

10. The method of claim 9, wherein the VXML page has a plurality of menu options, and wherein the subscriber-customizer defines the order of the menu options.

11. The method of claim 9, wherein the VXML page has a plurality of menu options, and wherein the subscriber-customizer associates an input with each menu option, wherein responsive to the caller providing a given input, the menu option that is associated with the given input is selected.

12. The method of claim 9, wherein the VXML page has a plurality of menu options, and wherein the subscriber-customizer defines a voicemail function for at least one of the menu options.

* * * * *